(12) United States Patent
Rutherford et al.

(10) Patent No.: US 6,341,355 B1
(45) Date of Patent: Jan. 22, 2002

(54) AUTOMATIC CLOCK SWITCHER

(75) Inventors: Mark D. Rutherford, Fort Collins; Arthur G. Rogers, Windsor, both of CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/270,586

(22) Filed: Mar. 16, 1999

(51) Int. Cl.⁷ .................................................. G06F 1/06
(52) U.S. Cl. ..................................................... 713/501
(58) Field of Search ......................................... 713/501

(56) References Cited

U.S. PATENT DOCUMENTS

| | | | | |
|---|---|---|---|---|
| 4,398,155 A | * | 8/1983 | Atwell, Jr. et al. | 328/73 |
| 4,839,534 A | * | 6/1989 | Clasen | 307/269 |
| 4,942,371 A | | 7/1990 | Kashiwaba et al. | 331/14 |
| 4,943,788 A | | 7/1990 | Laws et al. | 331/11 |
| 4,949,051 A | | 8/1990 | Viola | 331/11 |
| 5,276,716 A | | 1/1994 | Winen | 375/120 |
| 5,291,528 A | * | 3/1994 | Vermeer | 375/106 |
| 5,473,588 A | | 12/1995 | Tanaka et al. | 369/47 |
| 5,526,332 A | | 6/1996 | Yamada et al. | 369/48 |
| 5,666,388 A | | 9/1997 | Neron | 375/376 |
| 5,673,006 A | | 9/1997 | Reinhardt | 331/3 |
| 5,745,011 A | | 4/1998 | Scott | 331/44 |

\* cited by examiner

*Primary Examiner*—Thomas M. Heckler
(74) *Attorney, Agent, or Firm*—Carstens, Yee & Cahoon, L.L.P.

(57) ABSTRACT

Upon receiving a normal select signal to switch from one clock to another the first clock continues as the output for a number of clock periods. The normal select signal is treated as a disconnect control signal only at the next positive edge of the first clock. The disconnect signal is delayed for a number of cycles and then applied to the control gate of the first clock only when a negative edge of the first clock is detected. Once the disconnect control signal has been issued and the first clock output is dead, the disconnect control signal starts the sequence for connecting the second clock to the output. The connect control signal is accepted at the next positive edge of the second clock, delaying the connect signal for a number of cycles and applying the connect signal to the control of the second clock only when a negative edge of the second clock is detected causing the second clock to disconnect from the output only at a negative edge. The failure of a specific clock is automatically detected by detecting a clock edge and counting clock periods of a second clock until detecting a second clock edge. Upon detecting the second edge before a predetermined number of second clock cycles, the sequence resets and counting starts anew. If a predetermined number of second clock cycles are counted before the next edge, a forced select signal is generated which immediately clears the disconnect circuitry and is simultaneously applied directly to the disconnect gate of the first clock.

37 Claims, 10 Drawing Sheets

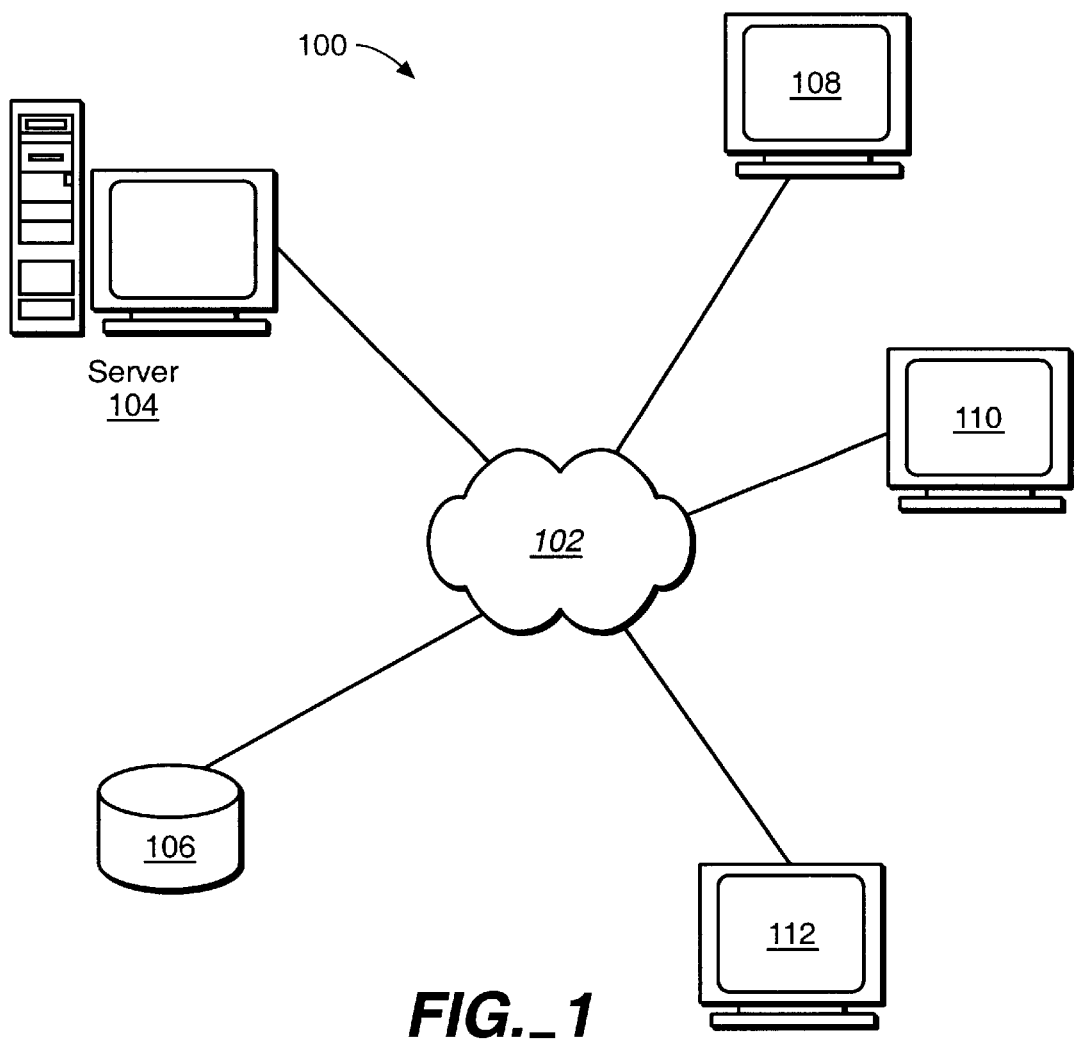
FIG._1
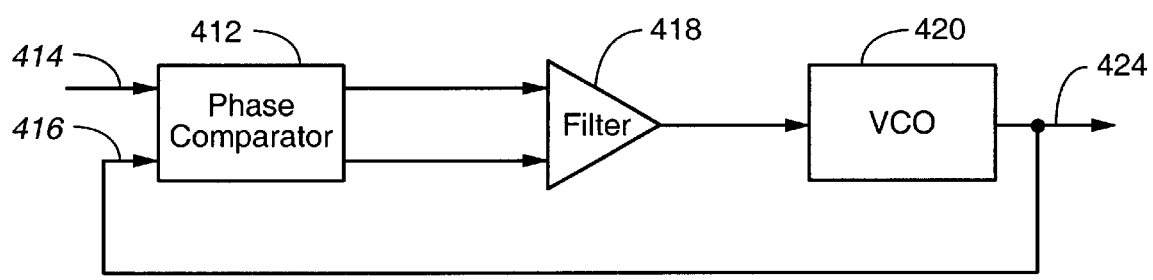
FIG._4

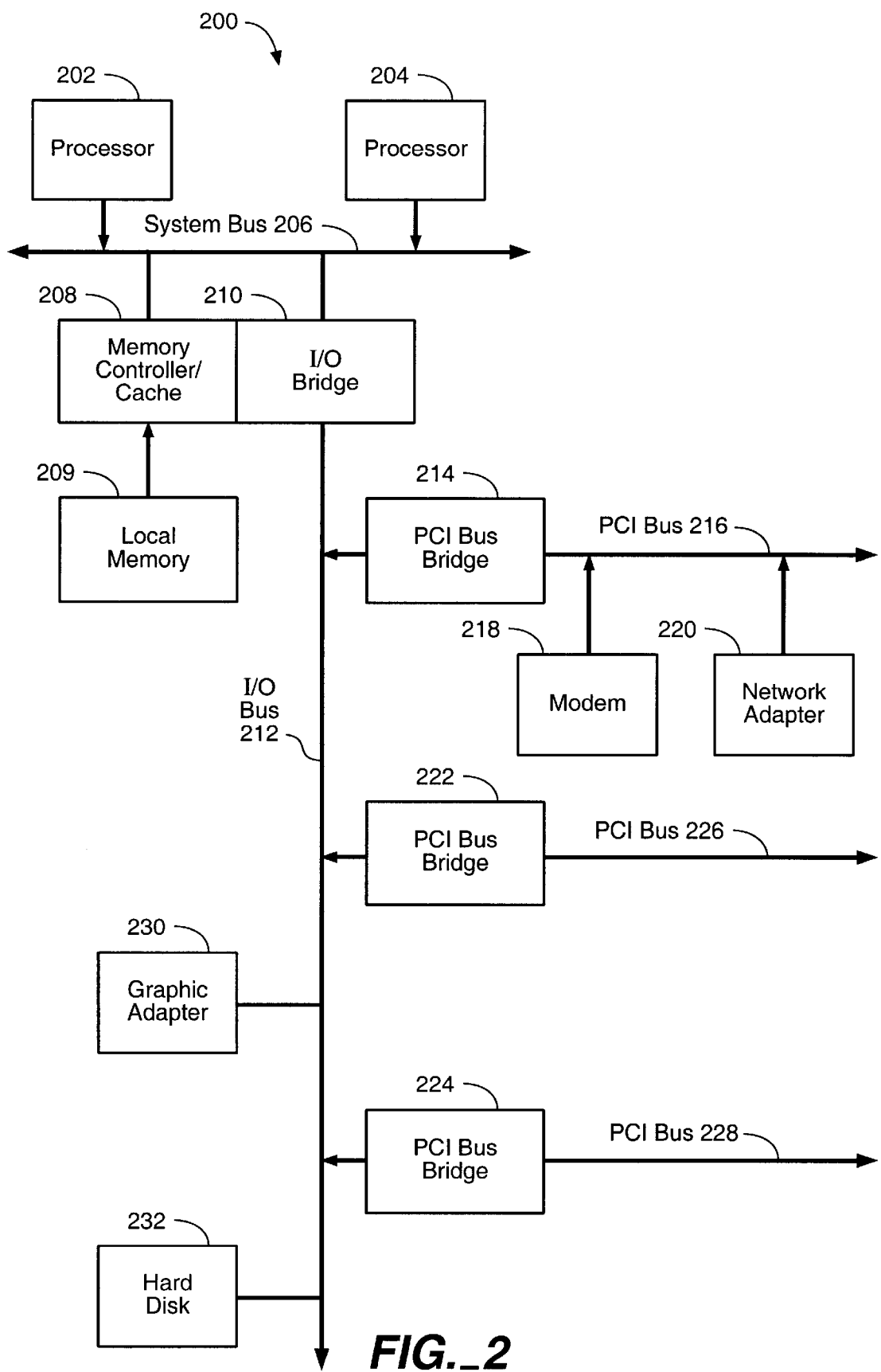
FIG._2

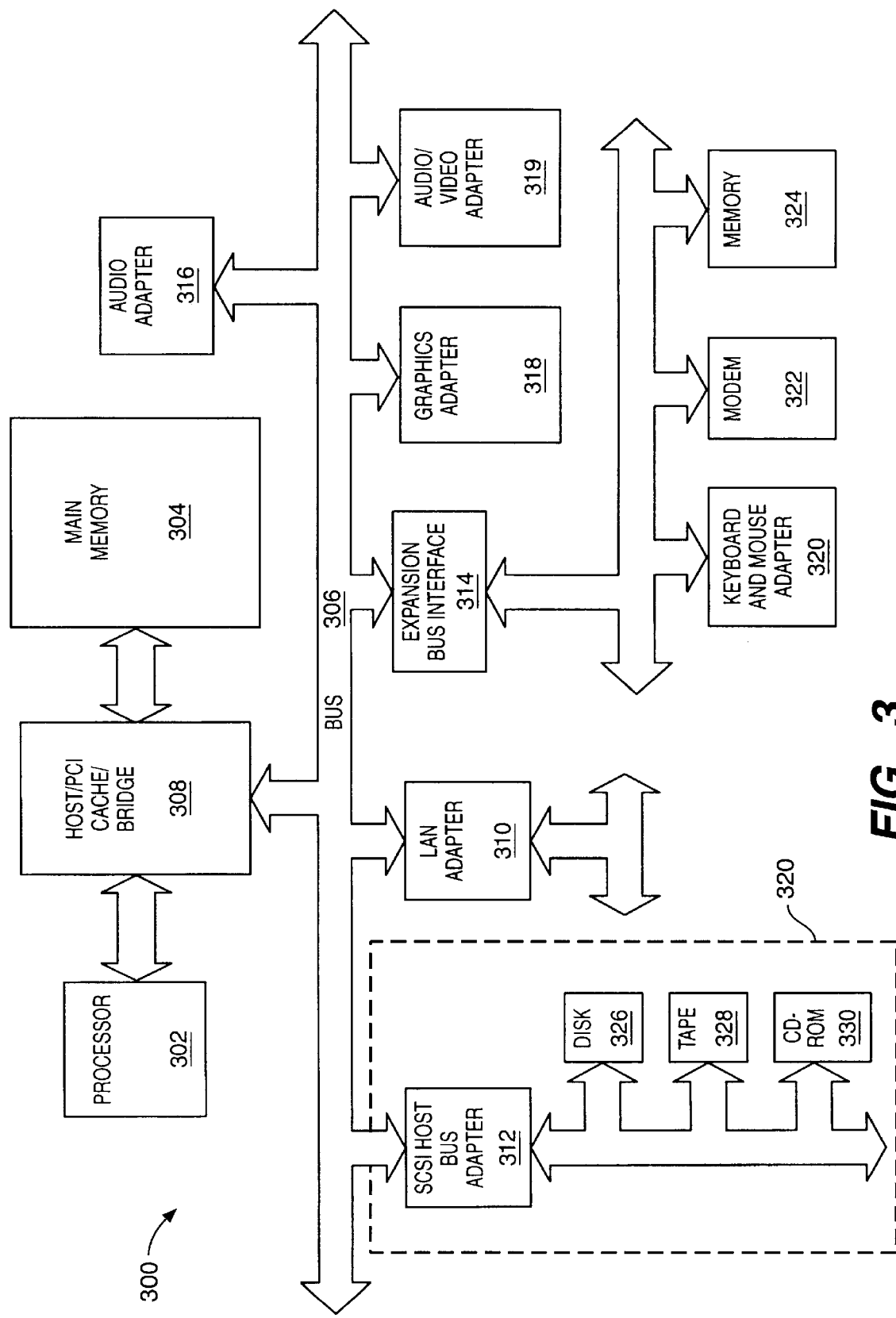
FIG._3

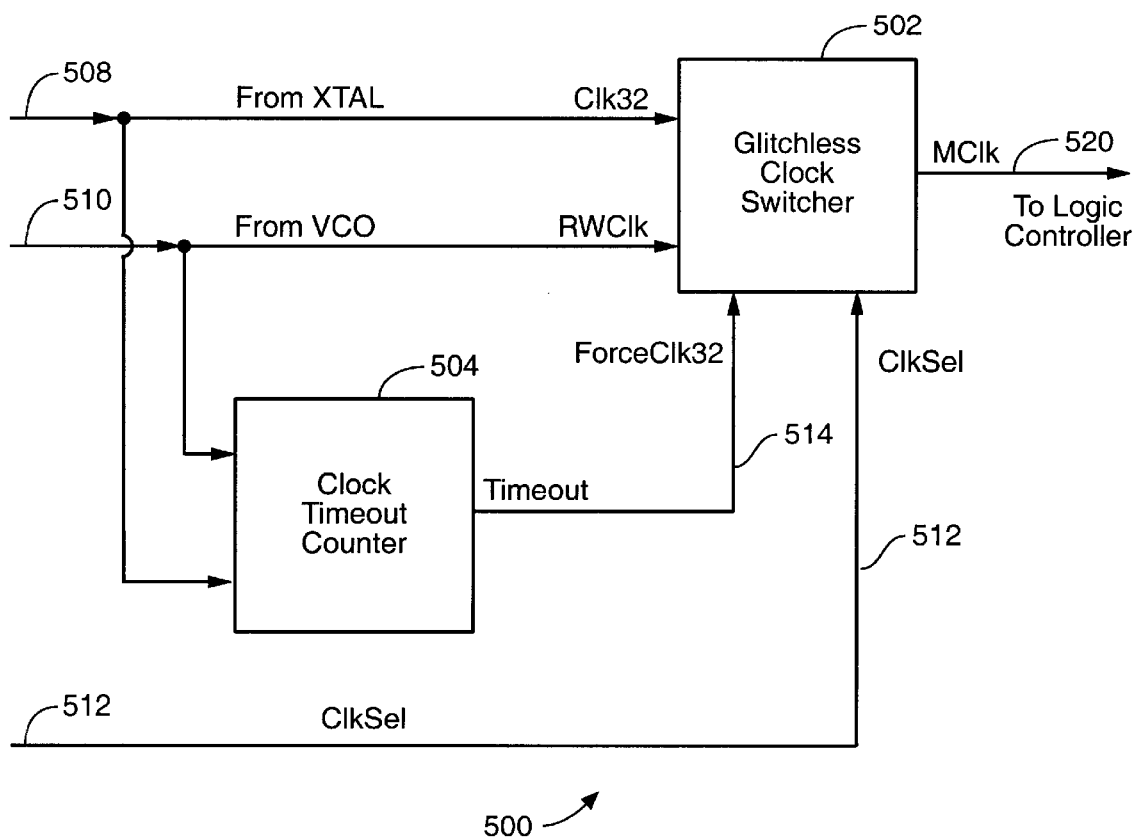
FIG._5

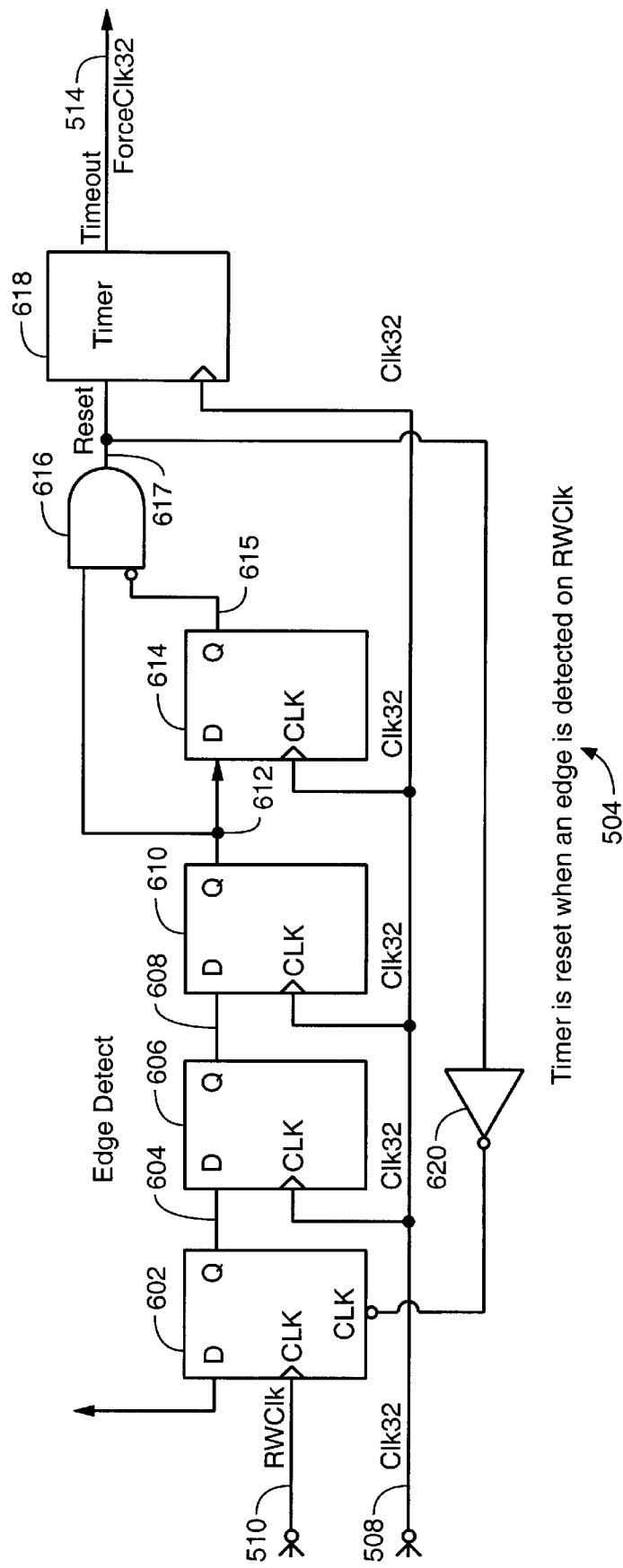
FIG._6

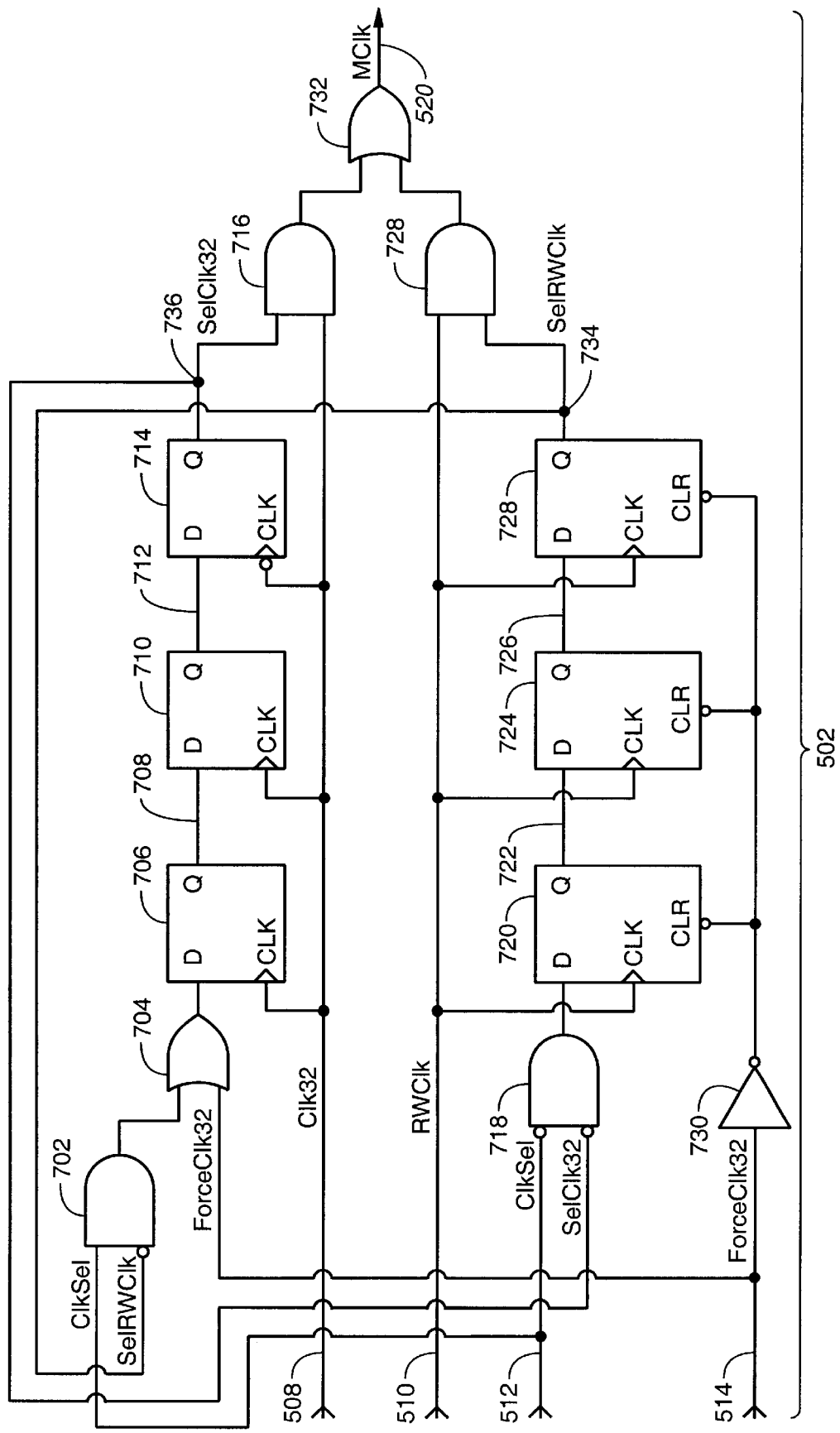
FIG._7

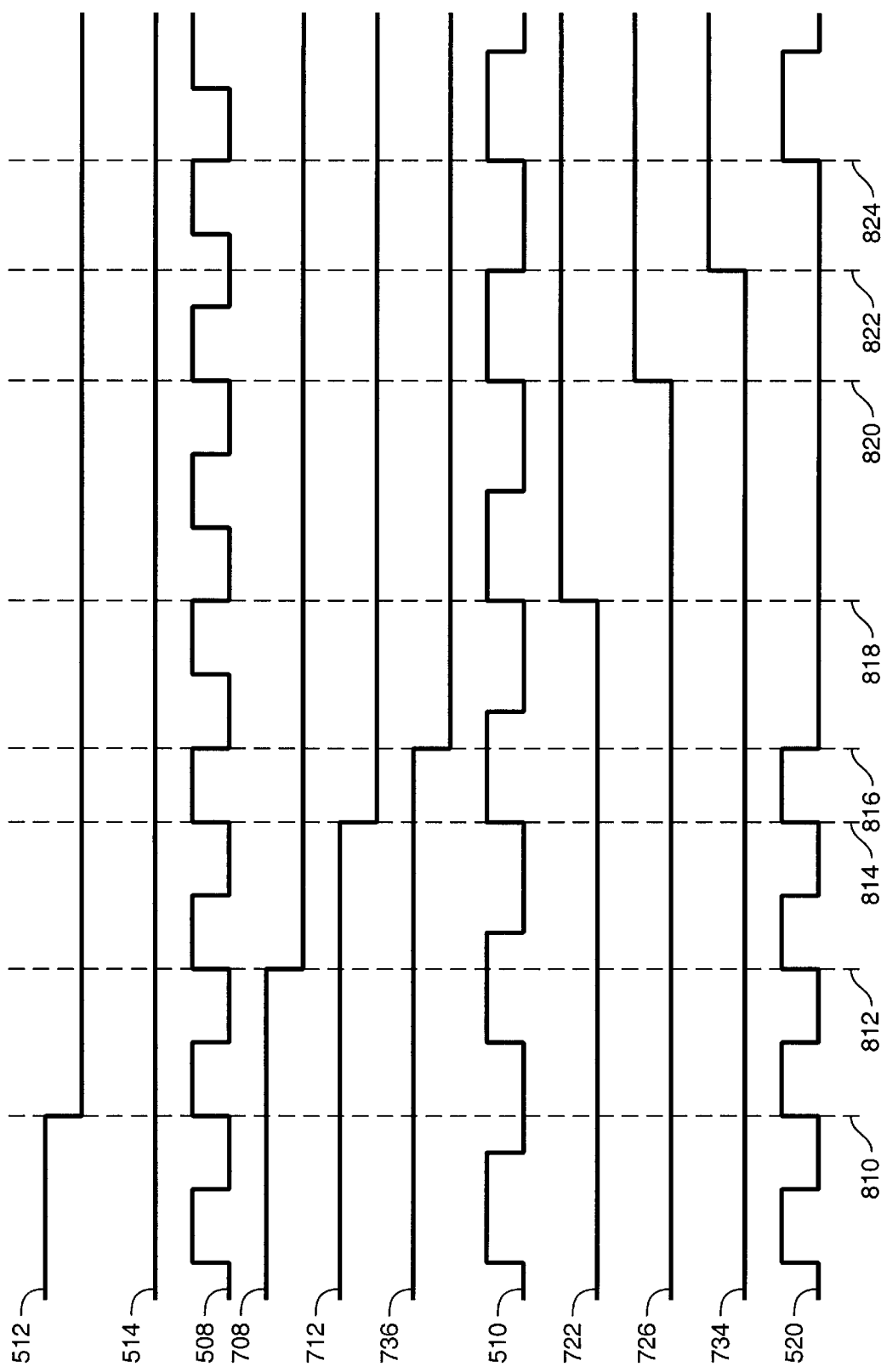
FIG._8

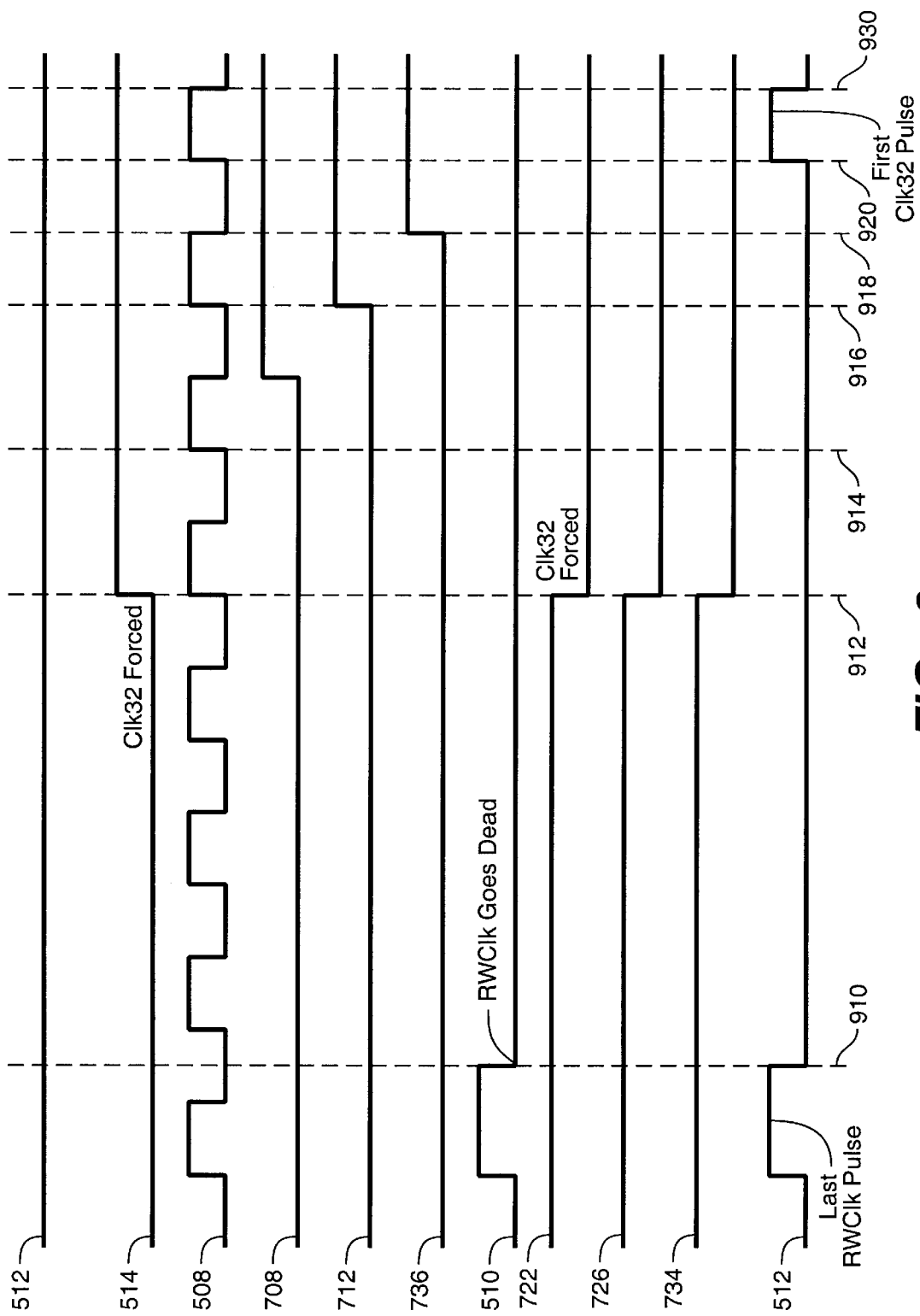
FIG._9

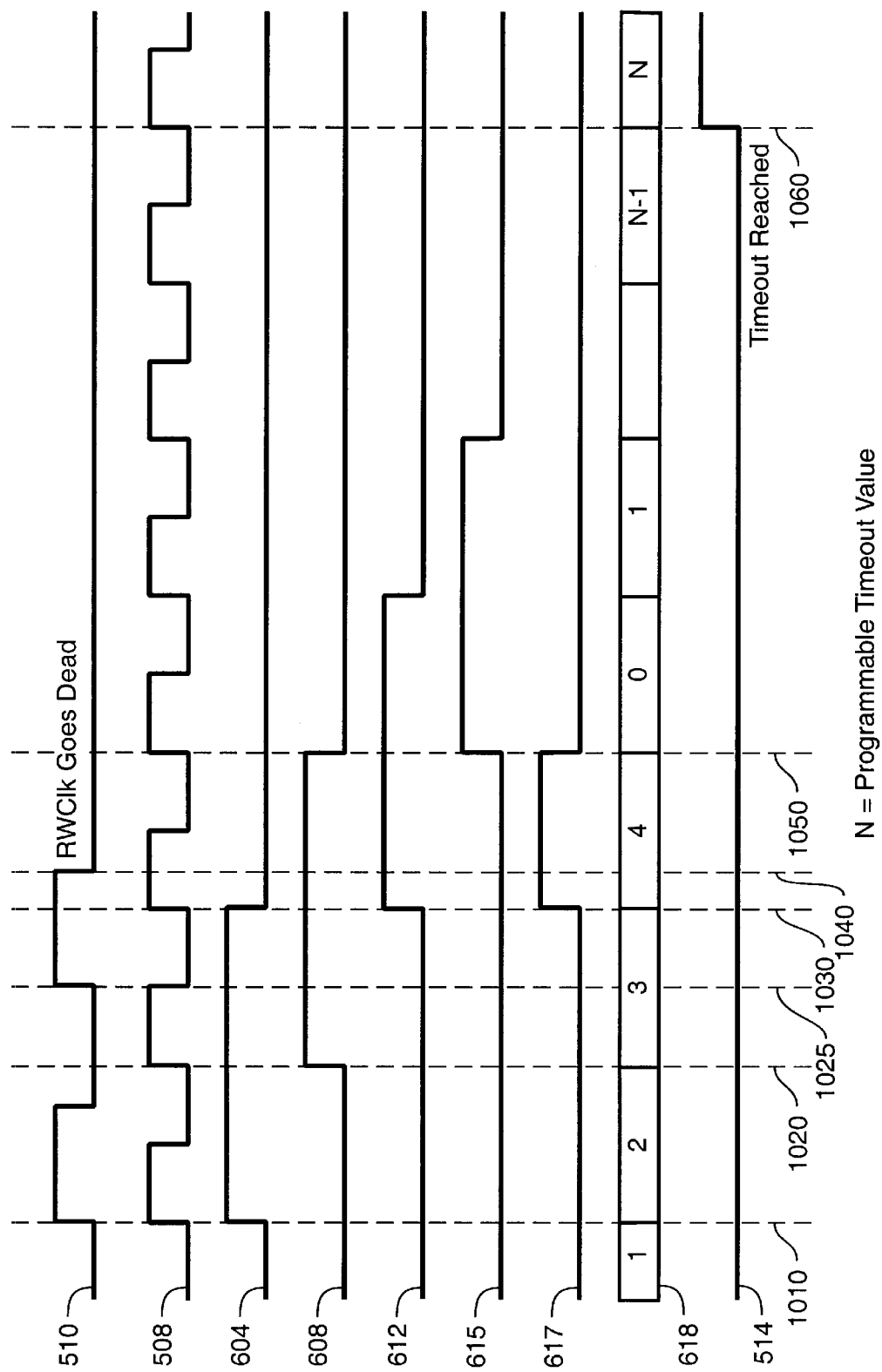
FIG._10

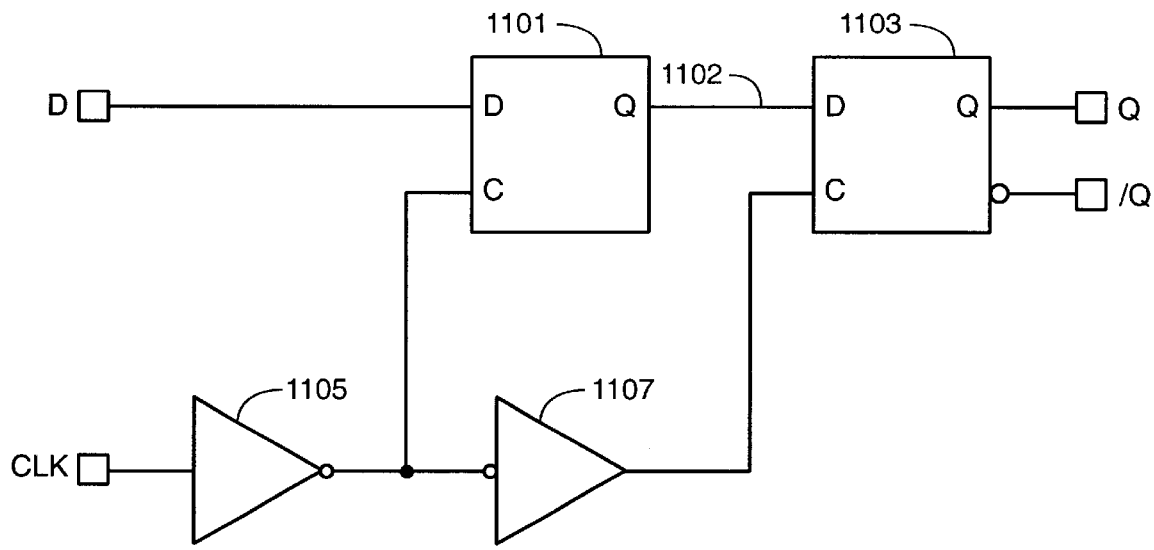
FIG._11A
| D | CLK | Q | /Q |
|---|---|---|---|
| 0 | ⎍ | 0 | 1 |
| 1 | ⎍ | 1 | 0 |
| x | 0 | Last Q | Last /Q |
| x | 1 | Last Q | Last /Q |
1120
FIG._11B

AUTOMATIC CLOCK SWITCHER

BACKGROUND OF THE INVENTION

1. Technical Field

The present invention relates to digital switching of a signal in a computer system. More specifically, the present invention relates to switching logical signals, or signals needed for controlling logic devices. Still more specifically, the present invention relates to a system and method for switching signals with clock logic devices without interfering with the logic of those devices.

2. Description of the Related Art

Digital switching of signals may be accomplished with a variety of devices. For example, digital multiplexers may have many different configurations, but in general, they have at least three inputs and a single output. On the input side, a generic multiplexer inputs a variety of data input signals. One signal is routed to the data output. Additionally, a generic multiplexer has another input for enabling a data input. This input causes an internal digital switch to change from one data input to another data input, thus routing the desired input to the output. A generic multiplexer switch data inputs without regard to the frequency, phase or sequence of the data steam on the data inputs.

Logic controlled devices are generally clocked by a digital clock but may, under certain circumstance, use an analog clock. Digital clocks such as crystal oscillators are generally considered superior to analog clocks because of their stability and reliability. Analog clocks, on the other hand, generally require tweaking the output frequency from time to time, which may upset the oscillation of the clock causing it to stop for a number of periods and go through a re-start sequence. While many logic controlled devices may remain stable during a set number of dead periods where the clock has become inoperable, many do not respond well to extremely short cycles between clock pulses or clocks. Such short cycling, or "glitching", may cause the logic device to lock up because certain components within the device respond to both clocks while other components within the device only respond to the first clock of a short cycle. Generally the device must be reset and re-started in order to clear the logic. Therefore, logic devices that rely on an analog clock for timing are at the mercy of the quirks of the analog technology even though digital clock pulses may be available from another clock.

A similar problem can occur when switching from one clock to another. When a generic multiplexer is used to switch from one clock to another, the multiplexer has no concept of timing and may output two pulses in rapid succession, one from the first clock and the second from the second clock after the switch. Thus, a glitch may cause logic controlled devices to lock up as described above. Therefore, if a circumstance arises for a logic controlled device to switch clocks, the switching process itself may lock up the logic device relying on the clock. Therefore, it would be advantageous to have an improved method and apparatus for switching between two clocks.

SUMMARY OF THE INVENTION

The present invention relates to a system and method for glitchlessly switching between one clock output and another clock output. Upon receiving a normal select signal to switch from one clock to another, the present invention continues to route the first clock to the output for a number of clock periods, as taken from the most reliable clock available, usually the crystal clock, whether that is the first or second clock. This is accomplished by accepting the normal select signal as a disconnect control signal only at the next positive edge of the first clock, delaying the disconnect signal for a number of cycles and then applying the disconnect signal to the control gate of the first clock only when a negative edge of the first clock is detected. This causes the first clock to disconnect from the output only at a negative edge. The edge designations could be reversed. Once the disconnect control signal has been issued and the first clock output is dead, the disconnect control signal starts the sequence for connecting the second clock to the output, thus the disconnect signal becomes the connect signal. In a manner similar to that described above, the connect control signal is accepted at the next positive edge of the second clock, delaying the connect signal for a number of cycles and then applying the connect signal to the control of the second clock only when a negative edge of the second clock is detected. This causes the second clock to disconnect from the output only at a negative edge. The edge designations could again be reversed. Additionally, the present invention automatically detects the failure of a specific clock by detecting a pulse edge and then counting clock periods of a second clock until detecting a second pulse edge. Upon detecting the second edge before a predetermined number of second clock cycles, the sequence resets and counting starts anew. If a predetermined number of second clock cycles are counted before the next edge is detected, a forced select signal is generated. Unlike the sequence described above, the forced selected signal clears the disconnect circuitry and is simultaneously applied directly to the disconnect gate of the first clock. The sequence then proceeds as described above. Clearly, the present invention may have more than two clock inputs.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 1 depicts a pictorial representation of a distributed data processing system in which the present invention may be implemented;

FIG. 2 is a block diagram depicting a data processing system which may be implemented as a server;

FIG. 3 depicts a block diagram which illustrates a data processing system in which the present invention may be implemented;

FIG. 4 is a block diagram illustrating a data recovery phase locked loop;

FIG. 5 is a block diagram illustrating an automatic clock switcher as embodied in the present invention;

FIG. 6 depicts a block diagram of a clock timeout counter of the present invention;

FIG. 7 is a diagram illustrating a glitchless clock switcher as embodied in the present invention;

FIG. 8 is a diagram depicting normal timing of a glitchless clock switcher as embodied in the present invention;

FIG. 9 is a diagram depicting forced selecting of a glitchless clock switcher as embodied in the present invention;

FIG. 10 is a timing diagram illustrating the clock timeout counter timing sequence when a clock, such as a voltage controlled oscillator clock goes dead;

FIG. 11A illustrates a circuit diagram using D latches for configuring an edge-triggered D flip-flop; and FIG. 11B illustrates a function table of inputs/outputs resulting from the preferred embodiment of the present invention.

DETAILED DESCRIPTION

With reference now to the figures, distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example and not as an architectural limitation for the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

With reference now to FIG. 3, a block diagram illustrates a data processing system in which the present invention may be implemented. Data processing system 300 is an example of a client computer. Data processing system 300 employs a peripheral component interconnect local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

As shown in FIG. 3, an operating system runs on processor 302 and is used to coordinate and provide control of various components within data processing system 300. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory), or optical disk drives and the like may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

Timing is crucial to the successful operation of a computer system as depicted in FIGS. 2 and 3. In many computer systems, virtually all data transfer as well as command and control information is synchronized by a clock. Mass storage devices, such as hard disk drive 326, tape drive 328, and CD-ROM 330, typically contain a phase locked loop to reconstruct a clock from the data being read from the media.

FIG. 4 is a block diagram illustrating a data recovery phase locked loop. A phase locked loop (PLL) is usually an analog system containing a phase comparator 412, which receives two inputs, a data input at node 414 and a voltage controlled oscillator input at node 416. Phase comparator 412 provides two inputs to loop filter 418, which provides the input to voltage controlled oscillator (VCO) 420. A bit clock signal aligned with the incoming data signal is provided as an output by VCO 420. Phase comparator 412 measures the difference between the transitions in the data-input 414 and the voltage controlled oscillator feedback at node 416 and creates an error indication input suitable for use by loop filter 418 under certain conditions.

Loop filter 418 converts these quantified error indications into a continuous voltage suitable for controlling VCO 420. In the example illustrated in FIG. 4, the control is generally an analog voltage. VCO 420 responds to the input levels by quickly, almost instantaneously changing its frequency to correspond to the level present on its input. In most embedded phase locked loop designs, various gain and transfer parameters are set for optimum performance. However, these parameters must be compromised to account for normal parametric variations that arise during the normal course of semiconductor processing.

The output of phase comparator 412 is filtered by loop filter 418 and sent to the VCO's control voltage input to create a feedback loop, so that as the frequency of the incoming data changes, the VCO's output frequency will track. If the data being read from the disk is sufficiently corrupted (for example, during a seek), the VCO's output frequency can become erratic, and VCO 420 may even stop oscillating. This can be disastrous to control logic being clocked by VCO output 424, especially any servo logic that is affected by VCO 420.

One method of lessening the severity of the problems arising from erratic frequency outputs from VCO 420 is to include a second clock input which can be used as desired for a particular task, or used as a backup clock in case the VCO output clock fails.

FIG. 5 illustrates a block diagram of an automatic clock switcher according to the present invention. Automatic clock switcher 500 may be included in a mass storage device which relies on a VCO for its clock, or might instead be contained in a component which relies on a clock for timing. In one embodiment of the present invention, an automatic clock switcher 500 consists of glitchless clock switcher (GCS) 502 and clock timeout counter 504. The automatic glitchless clock switcher has two clock inputs and one clock output. The inputs include Clk32 508 clock signal, which is generated by a crystal oscillator, and RWClk 510 clock signal, which is generated by a VCO in a phase lock loop circuit. Switched output MClk 520 goes to the disk logic controller. During normal operation, the disk logic controller can select which clock it wants to use by transmitting a clock select signal pulse on ClkSel 512. Typically, the RWClk clock generated by a VCO in a PLL is used during data fields, and the Clk32 clock generated by a crystal oscillator is used during servo fields.

Clock timeout counter 504 counts the number of Clk32 508 clock cycles since the last rising edge of RWClk 510 clock pulse. If this value exceeds the program value, n, RWClk 510 is considered dead, and the glitchless clock switcher is forced to switch to Clk32 508. An important feature of the present invention is the flexibility provided by programmably resetting the period between the last RWClk 510 pulse and a ForceClk32 514. The value of n can be input to timer counter 504 and thus adjusted for a particular application. In fact, in another embodiment of the present invention, the control circuitry itself may by substituted with software instructions for performing the processes described above and below.

In a preferred embodiment of the present invention, in order to switch back to RWClk 510 after a forced clock switch, RWClk 510 must be running and disk logic controller must try to select RWClk 510 via ClkSel 512.

FIG. 6 depicts a block diagram of clock timeout counter 504, from FIG. 5 according to the present invention. The purpose of clock timeout counter 504 is to generate a ForceClk32 514 signal in response to a predetermined number, n, of Clk32 508 clock cycles being counted after the last rising edge of RWClk 510. Clock timer 504 issues a clock timeout, ForceClk32 514 to glitchless clock switcher 502, forcing GCS 502 to switch from RWClk 510 to Clk32 508.

In a preferred embodiment of the present invention, clock timeout counter 504 uses two inputs: RWClk 510 from the VCO of the phase lock loop, and Clk32 508 from the crystal oscillator. Clock timeout counter 504 has one output, which is routed to GCS 502. An output signal, ForceClk32 514, to GCS 502 indicates that RWClk 510 has stopped.

In a preferred embodiment of clock timeout counter 504, RWClk 510 is connected to multiple stages consisting of positive edge-triggered D flip-flops. Edge-triggered D flip-flops are well known in the art and will be discussed only briefly here.

FIG. 11A illustrates a circuit diagram using D latches for configuring an edge-triggered D flip-flop. Latch 1101 is open when clock is LOW and output 1102 follows the input, D, so long as CLK is LOW. When CLK goes HIGH, latch 1101 closes and output 1102 maintains the last value of D during that closed period. Latch 1103 is open when CLK is HIGH, but Q output can only change at the beginning of the period because latch 1101 is closed and unchanging during the remainder of the timing interval. Therefore, Q output responds only to a change in D that is detected only during the rising edge of CLK, positive edge triggered. Problems can occur when the D input receives two inputs in the tripper period in rapid succession. In this case, the internal latches may latch in opposition to one another. The present invention alleviates this problem as discussed below.

FIG. 11B illustrates a function table of the input/output results. Table 1120 depicts outputs of Q and /Q in response to the data input D in clock input CLK in FIG. 11A.

As in any logic circuit, on start-up the data storage elements may contain unknown or spurious data and, therefore, in order to avoid an invalid state flip-flops should be re-set or preset to a known state.

Returning now to FIG. 6, in addition to having multiple stage positive edge-triggered D flip-flops, clock timeout counter 504 consists of AND gate 616, inverter 620, and timer 618. In order to better understand how the components of clock timeout counter 504 interact, FIG. 6 will be discusses in conjunction with FIG. 10, which is a timing diagram of signals within clock timeout counter 504. In the normal operation mode, the initial state of positive edge-triggered D flip-flop 602 is cleared and output 604 is LOW (all edge-triggered D flip-flops will hereinafter be referred to only as flip-flops unless the edge detection characteristics of the circuit are important to their operation). Input D is HIGH and output 604 remains LOW until reset pulse 617 abates and flip-flop 602 detects an upswing of RWClk 510. Once RWClk 510 goes HIGH, output 604 follows, also going HIGH. At this point, output 604 will remain HIGH until flip-flop 602 is again cleared by reset pulse 617 because input D remains HIGH, as can be seen by comparing signal 604 with signal 617 between time 1020 and time 1050 on FIG. 10. However, FIG. 10 is not completely indicative of a normal operating mode, as RWClk 520 goes dead at time 1040.

Flip-flop outputs 608, 612 and 615 each go HIGH, at sequential positive edges of clock Clk32 508 because the respective flip-flops are clocked by Clk32 508, as shown by comparing signals 608, 612 and 615 with Clk32 508 clock at times 1020, 1030 and 1050. Once flip-flop 606 detects positive edge on Clk32 508, flip-flop 606 will output the HIGH signal input from output 604 as flip-flop 606 output 608. The lag between signal 604 going HIGH and signal 608 going HIGH is indeterminable but not more than a single clock cycle because of the difference between the periods of the two clocks. Output 608 from flip-flop 606 is fed into flip-flop 610. At the next positive edge of Clk32 508, flip-flop 610 will output the HIGH signal from output 608 as flip-flop 610 output 612. The lag times between signals 608 and 612 and signals 612 and 615 are exactly one period each of Clk32 508, as shown by comparing signals 608 with 612 and 612 with 615 at times 1020, 1030 and 1050, respectively. Although not specifically shown in FIG. 10, these outputs remain HIGH until the one Clk32 508 clock period reset pulse 617 causes each output to go LOW for a period of one clock cycle in the same succession as each went HIGH.

Output 612 from flip-flop 610 is fed into both the data input of flip-flop 614 and one input of logical AND gate 616. Assuming output 615 from flip-flop 614 is LOW at the time signal 612 goes HIGH, time 1030, signal 615 is inverted HIGH and logical AND gate outputs HIGH signal 617. This is the start of rest pulse 617, see signal 617 on FIG. 10. The HIGH output 617 signal both resets the timer and clears flip-flop 602. Exactly one Clk32 508 clock cycle later, flip-flop 614 detects a positive edge on Clk32 508 and HIGH output 612 causes signal 615 to go likewise HIGH. Before entering AND gate 616, signal 615 is then inverted. Inverted HIGH signal 615 (now LOW) is ANDed to the HIGH signal 612 causing reset signal 617 to go LOW. Assuming RWClk 510 is functioning, at the next positive pulse of RWClk 510, signal 604 will again go HIGH, and the process described above repeats itself.

Again, although not shown on FIG. 10, the period between sequential reset pulses is a function of the number of flip-flop stages, and the time between the end of reset pulse 617 and the next positive edge of RWClk 510. In the example of the circuit on FIG. 6, the time between reset pulses will be two Clk32 508 clock cycles and the time between the end of reset pulse 617 and the next positive edge of RWClk 510. It is important to note here that the clock being monitored for failure, in this case RWClk 510, causes a reset pulse to be generated, but the delay until the pulse is generated is variable depending on the number of flip-flop stages employed in the circuit.

The generation of the timeout signal, ForceClk32 514, will now be discussed with respect to Timer 618 illustrated in FIG. 6 and in conjunction with the timing diagram illustrated in FIG. 10. Timer 618 has two inputs, a reset input and a control clock input. In the preferred embodiment, the control clock is Clk32 508, but the control clock cannot be the same clock as the clock being checked. Initially, timer 618 receives the reset pulse from signal 617 and resets a counter included within timer 618 (not shown). The counter then counts the number of clock cycles from Clk32 508. If another reset pulse is input before the counter counts n number of clock cycles, the timer is reset. If, on the other hand, no reset signal is input to counter 618 within a predetermined number of Clk32 508 cycles, n, timer 618 outputs a timeout signal, ForceClk32 514, to GCS 502. The counter within timer 618 is programmable, allowing the time between the last reset pulse and ForceClk32 514 signal to be variably changed. In the present example, n is an integer and represents the number of Clk32 508 cycles from the time an edge is detected on RWClk 510 and timer 618 issues a time signal to GCS 502.

In the depicted example, n must be greater than 3 because it will take exactly between two and three Clk32 508 clock cycles from the time flip-flop 602 detects an edge on RWClk 510 until reset pulse 617 can be output to timer 618. Choosing any value of n less than 3 risks the counter reaching its programmed value, n, before reset pulse 617 can be generated. In addition, the time between the end of reset pulse 617 and the next trigger edge of RWClk 510 must be considered when choosing a value of n, especially in a case where the period of the clock to be checked is greater than the period of the control clock.

In a preferred embodiment of the present invention, automatic clock switcher 500 uses RWClk 510 from the VCO only if the output from the VCO is operational. If the VCO becomes inoperable, clock timeout counter 504 detects the failure and, rather than immediately switching clocks, delays switching to Clk32 508 for a predetermined number of clock cycles. In fact, in either case, forced switching or normal switching, there is a three clock cycle delay from the time of the clock select signal and commencing the new clock. Once force switched by a timeout, GCS 502 will not use RWClk 510, even if it restarts. The logic controller in the device using the clock must signal GCS 502 to make the switch. By implementing the above discussed features, switching from one clock to another is said to be glitchless in that it is impossible for the two clock signals to interfere with each other during switching.

However, as noted above, the logic controller of the memory device may also switch to Clk32 508 by sending a ClkSel 512 signal to glitchless clock switcher 502. FIG. 7 is a block diagram illustrating glitchless clock switcher 502 as embodied in the present invention. GCS 502 has four inputs and one output. Inputs include the two clocks, Clk32 508 from the crystal oscillator and RWClk 510 from the VCO. Additionally, glitchless clock switcher 502 has two inputs for receiving control signals for causing GCS 502 to switch clocks. ForceClk32 514 going HIGH forces GCS 502 to use Clk32 508 clock output. Conversely, ClkSel 512 going LOW forces GCS 502 to use RWClk 510 clock output, if and only if RWClk is operational. ClockSel 512 going HIGH in normal operation selects Clk32 508.

Glitchless clock switcher 502 is nearly symmetrically divided between the crystal clock circuitry side and the VCO clock circuitry side. Each side inputs into an AND gate, Clk32 508 clock output and control signal SelClk32 736 input to AND gate 716, while RWClk 510 clock output and control signal SelRWClk 734 input to AND gate 728. In order for the output of either AND gate 716 or AND gate 728 to go HIGH, both the input clock and the corresponding select clock control signal must be HIGH.

The start up sequence requires timer counter 618 to be reset to LOW, or a logic 0, along with flip-flops 720, 724 and 728. Additionally, in order to set the logic of the present invention, flip-flops 706, 710 and 714 must be preset to HIGH, or a logic 1, in order to effect a start up. Clk32 508 is thus output to MClk 520 at startup. When a typical operation of GCS 502 occurs, Clk32 508 is being output as signal 520. Assuming GCS 502 is stable, ClkSel 512 is HIGH, as is SelClk32 736, which went HIGH a few clock cycles after the logic controller of the memory device selected Clk32. Because normal operation is assumed and RWClk 510 is operational, ForceClk32 514 is LOW, as can be seen on FIG. 8 at times before time 810. Normal switching from outputting Clk32 508 as output 520 to outputting RWClk 510 as output 520 will be described below with reference to FIG. 8.

Initially, the logic controller of the memory device selects RWClk 510 as its clock by causing ClkSel 512 signal to go LOW. AND gate 702 then logically ANDs the LOW ClkSel 512 with the inverted SelRWClk 734, which is HIGH, and outputs a LOW as an input to OR gate 704. Assuming ForceClk32 514 is also LOW, the two LOW inputs are ORed resulting in a LOW output. The LOW output is then input to the data input of positive edge-triggered D flip-flop 706. At the next rise of Clk32 508, the input of the LOW from OR gate 704 cause the output of flip-flop 706 to go LOW, as can be seen by signal 708, FIG. 8. That LOW then provides a data input for flip-flop 710 and, in turn, at the next positive edge of Clk32 508, the output of flip-flop 710 also becomes LOW, as shown in FIG. 8, signal 712.

Note that it takes two full Clk32 508 clock cycles before signal 712 goes LOW at time 814, starting from time 810, when the logic controller of the memory device signals GCS 502 to switch clocks. Next, LOW signal 712 is fed into the data input of negative edge-triggered D flip-flop 714 thus changing the output only when a negative edge is detected on RWClk 510. Note that, whereas an entire clock cycle delay was encountered between two positive edge-triggered D flip-flops, only a half clock cycle delay occurs before the output of flip-flop 714 goes LOW. Compare signals 708 and 712 at times 812 and 814, with signals 712 and 736 at times 814 and 816.

LOW signal SelClk32 736 inputs directly to AND gate 716. It is also inverted HIGH and input to AND gate 718, only after which RWClk 510 can be output to MClk 520. The LOW signal SelClk32 736 causes the output of AND gate 716 to go LOW. Therefore, as Clk32 508 goes HIGH, it is ANDed with the LOW of SelClk32 736, and the output of AND gate 716 remains LOW during the period of the clock.

At AND gate 718 the inverted LOW SelClk32 736 is ANDed with the inverted LOW of ClkSel 512 producing a HIGH output, which is fed into the data input of positive edge-triggered D flip-flop 720. At the next rising edge of RWClk 510, the output signal 722 of flip-flop 720 goes HIGH, as shown by signal 722 in FIG. 8. Output 722 of flip-flop 720 is then fed into the data input of flip-flop 724. At the following rising edge of clock RWClk 510, the output signal 726 of flip-flop 724 also goes HIGH. Depending on when SelClk32 736 goes LOW, the rise of 726 can be delayed up to two RWClk 510 clock cycles. HIGH signal 726 is then fed into the data input of negative edge-triggered D flip-flop 728, thus changing the output only when a negative edge is detected on RWClk 510. As described above with respect to the control circuit of Clk32 508, rather than having a full clock cycle delay because flip-flop 728 is negative edge-triggered, the delay is one half clock cycle, as can be seen by signal 726 in FIG. 8 at times 818, 820 and 822 when comparing signals 722, 726 and 734, respectively. Flip-flop 728 then causes signal SelRWClk 734 to go HIGH. The HIGH signal is then fed to both the input of AND gate 728 as a HIGH, and the input of AND gate 702 as an inverted HIGH or as a LOW, thus signal SelRWClk 734 is used to control the output of Clk32 508 to MClk 520. Once the control input of AND gate 728 goes HIGH, then each HIGH clock pulse of RWClk 510 is passed through to the input of OR gate 732 and ORed as output 520, which is used by the disk logic controller. In FIG. 8, compare signals 734 and output MClk 520, at times 822 and 824 respectively.

If, however, clock timeout counter 504 detects a failure from the VCO clock, RWClk 510, a ForceClk32 signal is input to GCS 502. This sequence will be described with respect to the signals on the timing diagram of FIG. 9. If the VCO oscillator goes dead, RWClk 510 immediately stops causing output MClk 520 to stop oscillating. However, GCS 502 does not immediately switch from the VCO clock to the crystal clock, as was discussed above. Instead, a number of clock cycles must pass before clock timeout counter 504 will issue the necessary timeout ForceClk32 signal 514. Of course the clock cycles are clocked by the crystal clock Clk32 508. With ForceClk32 514 HIGH, latches within flip-flops 720, 724 and 728 are cleared through inverter 730 causing an immediate LOW SelRWClk 734 output, and latches within flip-flops 706, 710 and 714 remain latched on, maintaining a LOW SelClk32 736. Therefore, MClk 520 will remain LOW until a number of Clk32 508 periods after the final reset 617 triggered by the final pulse of RWClk 510. A first delay is due to the counter in timer 618 as discussed above. However, a second delay which occurs after timer 618 issues a timeout is proportional to the number of flip-flop stages the control signal must traverse, similar to delay in clock timeout counter 504.

FIG. 10 illustrates the worst delay case for the VCO clock—RWClk 510 going dead. That is when the rising edge of the last pulse of RWClk 510 clock occurs slightly before the rising edge of the reset pulse 617. The delay between the last RWClk 510 pulse and the timeout is at it most, see signals RWClk 510 and timeout 514, between times 1030 and 1060 in FIG. 10. At time 1025, the last positive edge from VCO clock RWClk 510 occurs. At time 1030, positive edge of reset pulse 617 occurs. Subsequent to the positive edge of the reset pulse, the negative edge of the last RWClk 510 pulse occurs at time 1040. Finally, at time 1050, reset pulse 617 goes LOW.

Referring again to FIG. 6, with respect to the timing diagram in FIG. 10, at time 1040 RWClk 510 goes dead. This corresponds to time 910 in FIG. 9. The leading edge of a reset pulse is generated by AND gate 616 when the output of flip-flop 610 goes HIGH. The reset pulse stays HIGH for exactly one Clk32 508 clock cycle. At that time, positive edge-triggered D flip-flop 614 goes HIGH and is inverted into AND gate 616 causing reset 617 to go LOW. Therefore, the pulse width is exactly one Clk32 508 period in duration, as can be seen by signal 617 between time 1030 and time 1050 in FIG. 10. This reset clears positive edge-triggered D flip-flop 602 and causes its output 604 to go LOW. Therefore, unless the VCO clock is actively generating pulses on RWClk 510, signal 604 stays LOW, as can be seen in FIG. 10. The LOW signal output by flip-flop 602 causes the outputs of flip-flops 606, 610 and 614 also to go LOW, as can be seen by signals 608, 612 and 615, respectively, in FIG. 10. Thus, unless another positive edge on RWClk 510 occurs, both signals 612 and 615, which feed AND gate 616, remain LOW keeping the output 617 LOW. Therefore, no reset pulse is generated for timer 618. As output 615 of flip-flop 614 goes HIGH and is inverted LOW and ANDed to the output of flip-flop 610 by AND gate 616, reset pulse 617 goes LOW, which in turn starts the timing sequence and timer 618. A counter in 618 counts the number of Clk32 508 clock cycles between reset 617 pulses. If the counter within timer 618 counts n number of clock cycles without having reached a reset pulse, the timer issues a timeout to GCS 502.

Returning to FIG. 7, the timeout for ForceClk32 514 HIGH signal is then passed to OR gate 704, which resets each of flip-flops 720, 724 and 728, and drives LOW outputs 722, 726 and 734 respectively, as can be seen at time 912 in FIG. 9. The HIGH ForceClk32 514 signal is then ORed by OR gate 704 with the LOW output of AND gate 702 (SeIRWClk 734 being LOW and then inverted HIGH, and ClkSel 512 being LOW as can be seen at time 912). The resulting HIGH signal from the output of OR 704 is then fed to the data input of positive edge-triggered D flip-flop 706. At the next rise of Clk32 508, which occurs at time 914, signal 708 goes HIGH providing a HIGH input for flip-flop 710 and, as before, one Clk32 508 clock cycle later, time 916, output 712 of flip-flop 710 goes HIGH. As noted before, the final flip-flop is a negative edge-triggered D flip-flop 714. Therefore, one half of a clock cycle later, flip-flop 714 encounters a negative edge of Clk32 508, and output 736 goes HIGH at time 918. Thus, the SelClk32 side of AND gate 716 goes HIGH. The two inputs of AND gate 716 are ANDed, and a HIGH output is delivered to OR gate 732. Clk32 is then output as signal MClk 520, see time 920 in FIG. 9. Of course, at time 930, Clk32 508 goes LOW, and the output of AND gate 716 delivered to OR gate 732 goes LOW, causing MClk 520 to go LOW until the next upswing of Clk32.

It is important to note that while the present invention has been described in the context of a fully functioning circuitry and data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description but is not limited to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for switching from a first clock output to a second clock output, the method is being implemented in data processing system in which at least one system component is clocked by the output of a clock, the method comprising:

receiving a first clock output from a first clock;

receiving a second clock output from a second clock;

receiving a first signal containing first switching data;

receiving a second signal containing second switching data;

based on the first switching data contained in the first signal and the second switching data contained in the second signal, disconnecting the output of the first clock from the system component;

receiving a third signal containing third switching data;

receiving a fourth signal containing fourth switching data; and based on the third clock switching data contained in the third signal and the fourth switching data contained in the fourth signal, connecting the output of the second clock to the system component for clocking the system component.

2. The data processing system implemented method recited in claim 1 further comprising:

receiving a first pulse which is generated by the first clock;

counting a number of clock cycles in the output of the second clock which occur after the first pulse which is generated by the first clock and occur before a second pulse which is generated by the first clock;

in response to the number of clock cycles exceeding a predetermined value, discontinuing counting;

in response to the number of clock cycles exceeding a predetermined value, issuing a second signal containing second clock switching data and issuing a fourth signal containing first clock switching data; and wherein the predetermined value is any real number.

3. The data processing system implemented method recited in claim 2 the step of disconnecting the output of the first clock from the system component further comprises:

in response to disconnecting the output of the first clock from the system component, issuing a third signal containing a connect type of first clock switching data.

4. The data processing system implemented method recited in claim 2, wherein the predetermined value is adjustable.

5. The data processing system implemented method recited in claim 2 further comprising:
  detecting a second pulse; and
  in response to detecting the second pulse prior to the number of clock cycles exceeding the predetermined value, wherein the predetermined value is any real number, restarting counting.

6. The data processing system implemented method recited in claim 2, the step of connecting the output of the second clock to the system component further comprises:
  in response to receiving the fourth signal containing fourth switching data, delaying connecting the output of the second clock to the system component for clocking the system component for a predetermined number of clock cycles, wherein the predetermined number is any real number.

7. The data processing system implemented method recited in claim 1, the step of disconnecting the output of the first clock from the system component further comprises:
  delaying disconnecting the output of the first clock from the system component for a predetermined number of clock cycles, wherein the predetermined number is any real number.

8. The data processing system implemented method recited in claim 7, the step of disconnecting the output of the first clock from the system component further comprises:
  in response to disconnecting the output of the first clock from the system component, issuing a third signal containing third switching data.

9. The data processing system implemented method recited in claim 7, the step of connecting the output of the second clock to the system component further comprises:
  delaying connecting the output of the second clock to the system component for a predetermined number of clock cycles, wherein the predetermined number is any real number.

10. The data processing system implemented method recited in claim 1 further comprising:
  based on the third switching data contained in the third signal and the fourth switching data contained in the fourth signal, disconnecting the output of the second clock from the system component for clocking the system component; and
  based on the first switching data contained in the first signal and the second switching data contained in the second signal, reconnecting the output of the first clock to the system component.

11. The data processing system implemented method recited in claim 10, the step of disconnecting furthering comprises:
  delaying disconnecting the output of the second clock from the system component for a predetermined number of clock cycles, wherein the predetermined number is any real number;
  issuing a first signal containing first switching data; and
  based on first signal containing first switching data, delaying connecting the output of the first clock to the system component for a predetermined number of clock cycles, wherein the predetermined number is any real number.

12. The data processing system implemented method recited in claim 1, wherein the first clock includes a crystal oscillator and a voltage controlled oscillator in a phased locked loop circuit.

13. A method for switching from an output from a first clock to an output from a second clock, the method is implemented in data processing system in which at least one system component is clocked by the output of a clock, the method comprising:
  receiving a signal for switching from the output of the first clock to the output of the second clock;
  based on the clock switching signal, delaying disconnecting the output of the first clock from the system component for a first predetermined number of clock cycles, wherein the first predetermined number is any real number; and
  based on the clock switching signal, delaying connecting the output of the second clock to the system component for a second predetermined number of clock cycles, wherein the second predetermined number is any real number.

14. The data processing system implemented method recited in claim 13 wherein the first and second predetermined numbers are changeable.

15. An apparatus for switching from a first clock output to a second clock output, the method is implemented in data processing system in which at least one system component is clocked by the output of a clock, the apparatus comprising:
  receiving means for receiving a first clock output from a first clock;
  receiving means for receiving a second clock output from a second clock;
  receiving means for receiving a first signal containing first switching data;
  receiving means for receiving a second signal containing second switching data;
  disconnecting means for disconnecting the output of the first clock from the system component based on the first switching data contained in the first signal and the second switching data contained in the second signal;
  receiving means for receiving a third signal containing third switching data;
  receiving means for receiving a fourth signal containing fourth switching data; and
  connecting means for connecting the output of the second clock to the system component for clocking the system component based on the third clock switching data contained in the third signal and the fourth switching data contained in the fourth signal.

16. The apparatus recited in claim 15 further comprising:
  receiving means for receiving a first pulse which is generated by the first clock;
  counting means for counting a number of clock cycles in the output of the second clock which occur after the first pulse which is generated by the first clock and occur before a second pulse which is generated by the first clock;
  discontinuing means for discontinuing counting in response to the number of clock cycles exceeding a predetermined value;
  issuing means for issuing a second signal containing second clock switching data and issuing a fourth signal containing first clock switching data in response to the number of clock cycles exceeding a predetermined value; and
  wherein the predetermined value is any real number.

17. The data processing system implemented method recited in claim 16 system component further comprises:
  issuing means for issuing a third signal containing a connect type of first clock switching data in response to disconnecting the output of the first clock from the system component.

18. The apparatus in claim 16, wherein the predetermined value is adjustable.

19. The apparatus recited in claim 16 further comprising:
   detecting means for detecting a second pulse; and
   restarting means for restarting counting in response to detecting the second pulse prior to the number of clock cycles exceeding the predetermined value, wherein the predetermined value is any real number.

20. The apparatus recited in claim 16, the connecting means for connecting the output of the second clock to the system component further comprises:
   delaying means for delaying disconnecting the output of the second clock from the system component for a predetermined number of clock cycles, wherein the predetermined number is any real number.

21. The apparatus recited in claim 15, the step of disconnecting the output of the first clock from the system component further comprises:
   delaying means for delaying disconnecting the output of the first clock from the system component for a predetermined number of clock cycles, wherein the predetermined number is any real number.

22. The apparatus recited in claim 21, the disconnecting means for disconnecting the output of the first clock from the system component further comprises:
   issuing means for issuing a third signal containing third switching data in response to disconnecting the output of the first clock from the system component.

23. The apparatus recited in claim 21, connecting means for connecting the output of the second clock to the system component further comprises:
   delaying means for delaying connecting the output of the second clock to the system component for a predetermined number of clock cycles, wherein the predetermined number is any real number.

24. The apparatus recited in claim 15 wherein the clock switching indicator is a first clock switching indicator, the apparatus further comprising:
   disconnecting means for disconnecting the output of the second clock from the system component for clocking the system component based on the third switching data contained in the third signal and the fourth switching data contained in the fourth signal; and
   reconnecting means for reconnecting the output of the first clock to the system component based on the first switching data contained in the first signal and the second switching data contained in the second signal.

25. The apparatus recited in claim 24 wherein the disconnecting means for disconnecting furthering comprises:
   delaying means for delaying disconnecting the output of the second clock from the system component for a predetermined number of clock cycles, wherein the predetermined number is any real number;
   issuing means for issuing a first signal containing first switching data;
   based on first signal containing first switching data, delaying connecting the output of the first clock to the system component for a predetermined number of clock cycles, wherein the predetermined number is any real number; and
   receiving means for receiving a component issued type of clock switching indicator.

26. The system recited in claim 15, where in the first clock is one of a crystal oscillator and a voltage controlled oscillator in a phased locked loop circuit.

27. A system for switching from an output from a first clock to an output from a second clock, the system is connected to at least one system component which is clocked by the output of a clock, the system comprises:
   receiving means for receiving a signal for switching from the output of the first clock to the output of the second clock;
   delaying disconnecting means for disconnecting the output of the first clock from the system component for a first predetermined number of clock cycles, wherein the first predetermined number is any real number based on the clock switching signal; and
   delaying means for delaying connecting the output of the second clock to the system component for a second predetermined number of clock cycles, wherein the second predetermined number is any real number based on the clock switching signal.

28. The system recited in claim 27 wherein the first and second predetermined numbers are changeable.

29. A logical circuit for switching from an output from a first clock to an output from a second clock, the circuit is connected to at least one system component which is clocked by the output of a clock, the circuit comprises:
   a first clock control and output circuit comprising:
      a first clock input;
      a first clock control input;
      a first stage flip-flop, the flip-flop having a plurality of inputs, connected to the first clock input and the first clock control input, the flip-flop further having at least one output; and
      at least a second stage flip-flop, the flip-flop having a plurality of inputs, connected to the first clock input and an output of the previous stage flip-flop, the flip-flop further having at least one output.

30. A logical circuit for switching from an output as recited in claim 29, further comprising:
   a second clock control and output circuit comprising:
      a second clock input;
      a second clock control input;
      a first stage flip-flop, the flip-flop having a plurality of inputs, connected to the second clock input and the second clock control input, the flip-flop further having at least one output; and
      at least a second stage flip-flop, the flip-flop having a plurality of inputs, connected to the second clock input and an output of the previous stage flip-flop, the flip-flop further having at least one output.

31. A logical circuit for switching from an output as recited in claim 29, further comprising:
   a counter timer circuit comprising:
      a first clock input;
      a second clock input;
      a first stage flip-flop, the flip-flop having a plurality of inputs, connected to the first clock input and the flip-flop further having at least one output;
      at least a second stage flip-flop, the flip-flop having two inputs, connected to the second clock input and an output of the previous stage flip-flop and the flip-flop further having at least one output;
      a logical AND gate having two inputs, one input connected to the output of the last stage flip-flop, and another input connected to the output of a next-to-last stage flip-flop, and the logical AND gate having at least one output connected to the first stage flip-flop; and
      a timer having at least two inputs, one connected to the second clock input, another one connected to the output of the logical AND, and the timer having one output connected to at least one flip-flop in the second clock control and output circuit.

32. A logical circuit for switching from an output as recited in claim 31, the first clock control and output circuit further comprising:
   a logical AND gate, having two inputs and an output and connected to the output of a final stage flip-flop and the first clock input.

33. A logical circuit for switching from an output as recited in claim 32, the second clock control and output circuit further comprising:
   a logical AND gate, having two inputs and an output and connected to the output of a final stage flip-flop and the second clock input.

34. A logical circuit for switching from an output as recited in claim 33 further comprising:
   an output logical OR gate, having two inputs, connected to the output of the logical AND gate in the first clock control and output circuit of the logical AND gate in the second clock control and output circuit, and the output logical OR gate having one output to the system component.

35. A logical circuit for switching from an output as recited in claim 29, further comprising:
   a second clock control and output circuit comprising:
      a second clock input;
      a second clock control input;
      a second clock forced control input;
      a first stage flip-flop, the flip-flop having a plurality of inputs, the inputs connected to the second clock input, the second clock control input and the second clock forced control input, and the flip-flop further having at least one output; and
      at least a second stage flip-flop, the flip-flop having two inputs, connected to the second clock input, the second clock forced control input and an output of the previous stage flip-flop and the flip-flop further having at least one output.

36. A computer program product including instructions for switching from a first clock output to a second clock output, the computer program product is embodied on a computer readable medium and implemented in data processing system in which at least one system component is clocked by the output of a clock, the instructions comprising:
   instructions for receiving a first clock output from a first clock;
   instructions for receiving a second clock output from a second clock;
   instructions for connecting the output of the first clock to a system component for clocking the system component;
   instructions for clocking the output of the first clock with the output of the second clock;
   instructions for receiving a clock switching indicator;
   instructions for disconnecting the output of the first clock from the system component based on the clock switching indicator; and
   instructions for connecting the output of the second clock to the system component for clocking the system component based on the clock switching indicator.

37. A computer program product including instructions for switching from a first clock output to a second clock output, the computer program product is embodied on a computer readable medium and implemented in data processing system in which at least one system component is clocked by the output of a clock, the instructions comprising:
   instructions for receiving a signal for switching from the output of the first clock to the output of the second clock;
   instructions for delaying disconnecting the output of the first clock from the system component for a first predetermined number of clock cycles, wherein the first predetermined number is any real number, based on the clock switching signal; and
   instructions for delaying connecting the output of the second clock to the system component for a second predetermined number of clock cycles, wherein the second predetermined number is any real number, based on the clock switching signal.

* * * * *